US009549365B2

(12) United States Patent
Uchino et al.

(10) Patent No.: US 9,549,365 B2
(45) Date of Patent: Jan. 17, 2017

(54) MOBILE COMMUNICATION SYSTEM, RADIO BASE STATION, MOBILITY MANAGEMENT NODE, AND MOBILE STATION

(71) Applicant: NTT DOCOMO, INC., Tokyo (JP)

(72) Inventors: Tooru Uchino, Tokyo (JP); Kenichiro Aoyagi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/431,107

(22) PCT Filed: Aug. 26, 2013

(86) PCT No.: PCT/JP2013/072648
§ 371 (c)(1),
(2) Date: Mar. 25, 2015

(87) PCT Pub. No.: WO2014/050394
PCT Pub. Date: Apr. 3, 2014

(65) Prior Publication Data
US 2015/0257082 A1 Sep. 10, 2015

(30) Foreign Application Priority Data
Sep. 28, 2012 (JP) .................................. 2012-217071

(51) Int. Cl.
*H04W 48/02* (2009.01)
*H04W 36/04* (2009.01)
(Continued)

(52) U.S. Cl.
CPC ................ *H04W 48/02* (2013.01); *H04L 5/00* (2013.01); *H04M 15/7657* (2013.01);
(Continued)

(58) Field of Classification Search
CPC ........ H04W 48/20; H04W 8/186; H04W 4/08; H04W 36/04; H04W 48/02; H04L 5/00; H04M 15/7657
See application file for complete search history.

(56) References Cited

U.S. PATENT DOCUMENTS 6,064,886 A * 5/2000 Perez .................... H04W 84/14
455/426.2
2012/0106511 A1* 5/2012 Wu ...................... H04W 76/064
370/331

(Continued)

FOREIGN PATENT DOCUMENTS

JP 2011-234239 A 11/2011
JP 2012-005089 A 1/2012

OTHER PUBLICATIONS

Pantech, "Handover considerations in CA," 3GPP TSG-RAN WG2 Meeting #70bis, R2-103546; Stockholm, Sweden; Jun. 28, 2010 (2 pages).

(Continued)

*Primary Examiner* — Ajay Cattungal
(74) *Attorney, Agent, or Firm* — Osha Liang LLP

(57) ABSTRACT

An objective is to avoid a situation where a mobile station UE, which is not a CSG member, uses a CSG cell as an Scell in CSG control. A radio base station eNB according to the invention includes a management unit 12 configured to manage at least one of a Pcell list and an Scell list, a reception unit 11 configured to acquire at least one of Pcell member information and Scell member information from a mobile station UE in a cell #10, and a control unit 13 configured to determine whether or not the mobile station UE can connect to the cell #10 as a Pcell and determine whether or not the mobile station UE can configure the cell #10 as an Scell by referring to the management unit 12 based (Continued)

on at least one of the Pcell member information and the Scell member information.

4 Claims, 6 Drawing Sheets

(51) Int. Cl.
*H04M 15/00* (2006.01)
*H04W 4/08* (2009.01)
*H04L 5/00* (2006.01)
*H04W 48/20* (2009.01)
*H04W 8/18* (2009.01)

(52) U.S. Cl.
CPC ............. *H04W 4/08* (2013.01); *H04W 36/04* (2013.01); *H04W 8/186* (2013.01); *H04W 48/20* (2013.01)

(56) References Cited

U.S. PATENT DOCUMENTS

| | | | | |
|---|---|---|---|---|
| 2012/0238268 A1* | 9/2012 | Radulescu | ........ | H04W 36/0061 455/435.1 |
| 2013/0044668 A1* | 2/2013 | Purnadi | ............ | H04W 36/0055 370/312 |
| 2013/0114568 A1* | 5/2013 | Sagae | ................ | H04W 72/085 370/332 |
| 2013/0225165 A1* | 8/2013 | Das | ........................ | H04W 48/16 455/434 |
| 2014/0031041 A1* | 1/2014 | Jung | ..................... | H04W 36/30 455/437 |
| 2014/0057566 A1* | 2/2014 | Watfa | ..................... | H04W 48/16 455/41.2 |
| 2014/0187246 A1* | 7/2014 | Jha | ......................... | H04W 48/08 455/436 |
| 2014/0362757 A1* | 12/2014 | Chang | .................. | H04W 76/002 370/312 |
| 2015/0237514 A1* | 8/2015 | Maeda | .................. | H04W 24/02 370/338 |

OTHER PUBLICATIONS

LG Electronics Inc., "Information provided to target eNB at handover," 3GPP TGS-RAN2 Meeting #71, R2-104879; Madrid, Spain; Aug. 23, 2010 (2 pages).

3GPP TS 36.300 V11.3.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)"; Sep. 2012 (205 pages).

International Search Report issued in PCT/JP2013/072648, mailed Oct. 8, 2013 (3 pages).

Written Opinion issued in PCT/JP2013/072648, mailed Oct. 8, 2013 (3 pages).

* cited by examiner

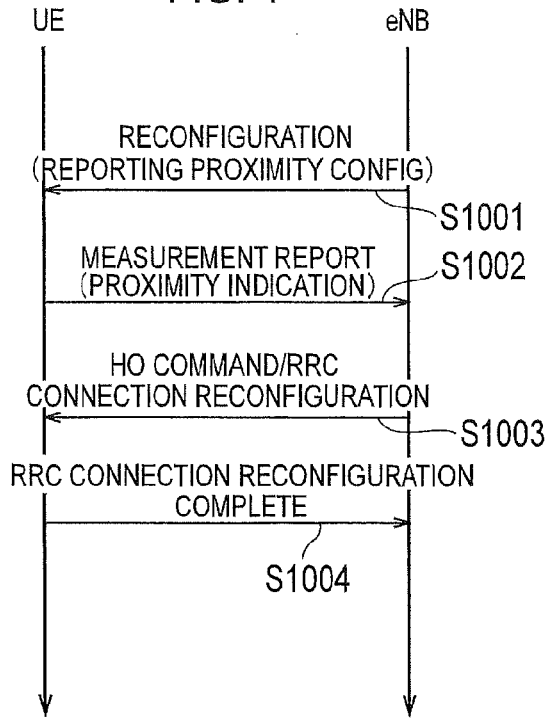
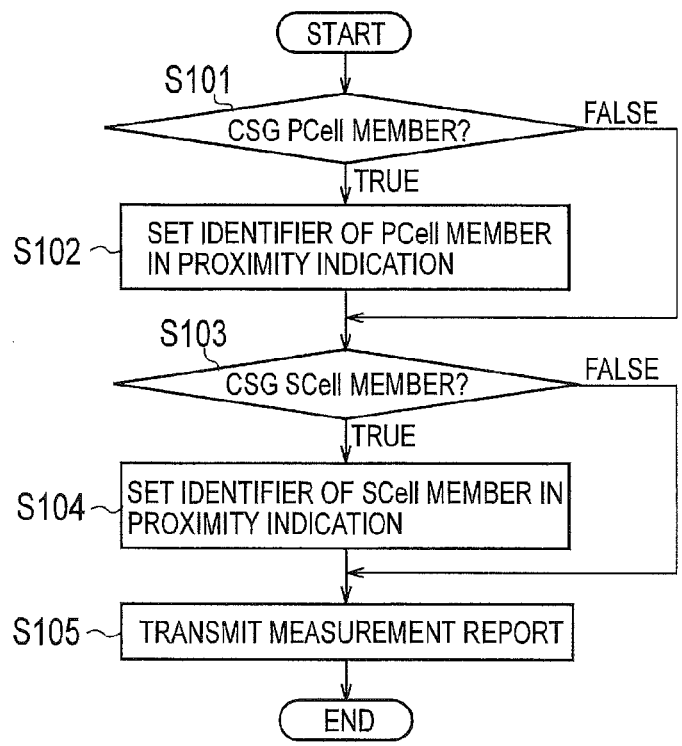

MOBILE COMMUNICATION SYSTEM, RADIO BASE STATION, MOBILITY MANAGEMENT NODE, AND MOBILE STATION

TECHNICAL FIELD

The present invention relates to a mobile communication system, a radio base station, a mobility management node, and a mobile station.

BACKGROUND ART

In LTE (Long Term Evolution)-Advanced, a mobile station UE is configured to be capable of performing CA (Carrier Aggregation) using multiple cells (or CCs: Component Carriers).

When the CA is performed, a Pcell (Primary cell) which is a highly reliable cell guaranteeing connectivity and an Scell (Secondary cell) which is an supplementary cell are configured for the mobile station UE.

The mobile station UE firstly connects to the Pcell and then can add the Scell as needed.

The Pcell is a cell similar to an LTE cell which supports RLM (Radio Link Monitoring), SPS (Semi-Persistent Scheduling) and the like. When the mobile station UE changes the Pcell to another cell, handover processing is needed.

On the other hand, the Scell is a cell configured for the mobile station UE in addition to the Pcell. The Scell is added and deleted by RRC (Radio Resource Control) signaling.

The Scell is a cell which is in a deactive state just after being configured for the mobile station UE, and is enabled to perform communications (be schedulable) only after being activated in a MAC (Media Access Control) layer.

Then, the 3GPP employs CSG (Closed Subscriber Group) control which is a mechanism to limit mobile stations UE allowed to connect to a small cell which is a phantom cell.

For example, the CSG control is used to provide a service only to a specific mobile station UE in a small cell.

As illustrated in FIGS. 6 and 7, a mobility management node MME manages a list of mobile stations UE allowed to connect to a cell #10 which is a CSG cell. When finding the cell #10, the mobile station UE reports that the mobile station UE is one allowed to connect to the cell #10 to a radio base station eNB by "Proximity Indication" or "Measurement report." The mobility management node MME is configured to allow the mobile station UE to connect to the cell #10 when the mobile station UE is included in the list.

PRIOR ART DOCUMENT

Non-Patent Document

Non-patent document 1: 3GPP TS36.300

SUMMARY OF THE INVENTION

However, the exiting CSG control can restrict connection of a mobile station UE to a CSG cell as a Pcell but cannot restrict use of a CSG cell as an Scell by a mobile station UE.

Accordingly, as illustrated in FIG. 8, there is a problem that a mobile station UE, which is not a CSG member, may possibly use a cell #10, which is a CSG cell, as an Scell.

Accordingly, the invention has been made in view of the above problem, and an objective of the invention is to provide a mobile communication system, a radio base station, a mobility management node, and a mobile station which are capable of avoiding a situation a mobile station UE, which is not a CSG member, uses a CSG cell as an Scell in CSG control.

A first feature of the present invention is summarized as a mobile communication system, including: a network configured to manage at least one of a first list which is a list of mobile stations allowed to connect to a cell under the network as a primary cell and a second list which is a list of mobile stations allowed to configure the cell as a secondary cell. Here, a mobile station in the cell notifies the network of at least one of first indication information indicating whether or not the mobile station is a member of the first list and second indication information indicating whether or not the mobile station is a member of the second list, and based on at least one of the first indication information and the second indication information and at least one of the first list and the second list, the network determines whether or not the mobile station is allowed to connect to the cell as a primary cell and determines whether or not the mobile station is allowed to configure the cell as a secondary cell.

A second feature of the present invention is summarized as a radio base station, including: a management unit configured to manage at least one of a first list which is a list of mobile stations allowed to connect to a cell under the radio base station as a primary cell and a second list which is a list of mobile stations allowed to configure the cell as a secondary cell; a reception unit configured to acquire, from a mobile station in the cell, at least one of first indication information indicating whether or not the mobile station is a member of the first list and second indication information indicating whether or not the mobile station is a member of the second list; and a control unit configured to determine whether or not the mobile station is allowed to connect to the cell as a primary cell and determine whether or not the mobile station is allowed to configure the cell as a secondary cell by referring to the management unit based on the at least one of the first indication information and the second indication information.

A third feature of the present invention is summarized as a mobility management node, including: a management unit configured to manage at least one of a first list which is a list of mobile stations allowed to connect to a cell under the mobility management node as a primary cell and a second list which is a list of mobile stations allowed to configure the cell as a secondary cell; a reception unit configured to acquire, from a mobile station in the cell, at least one of first indication information indicating whether or not the mobile station is a member of the first list and second indication information indicating whether or not the mobile station is a member of the second list; and a control unit configured to determine whether or not the mobile station is allowed to connect to the cell as a primary cell and determine whether or not the mobile station is allowed to configure the cell as a secondary cell by referring to the management unit based on the at least one of the first indication information and the second indication information.

A fourth feature of the present invention is summarized as a mobile station, including: a transmission unit configured to notify a network of at least one of first indication information indicating whether or not the mobile station is a member of a first list and second indication information indicating whether or not the mobile station is a member of a second list. Here, the first list is a list of mobile stations allowed to connect to a cell under the network as a primary cell, and the second list is a list of mobile stations allowed to configure the cell as a secondary cell.

BRIEF DESCRIPTION OF THE DRAWINGS

FIG. 4 is a sequential diagram illustrating an operation of the mobile communication system according to the first embodiment of the invention.

FIG. 5 is a flowchart illustrating an operation of the mobile station according to the first embodiment of the embodiment.

MODE FOR CARRYING OUT THE INVENTION

Mobile Communication System According to the First Embodiment of the Invention Described by referring to FIGS. 1 to 5 is a mobile communication system according to a first embodiment of the invention.

Figure 1:
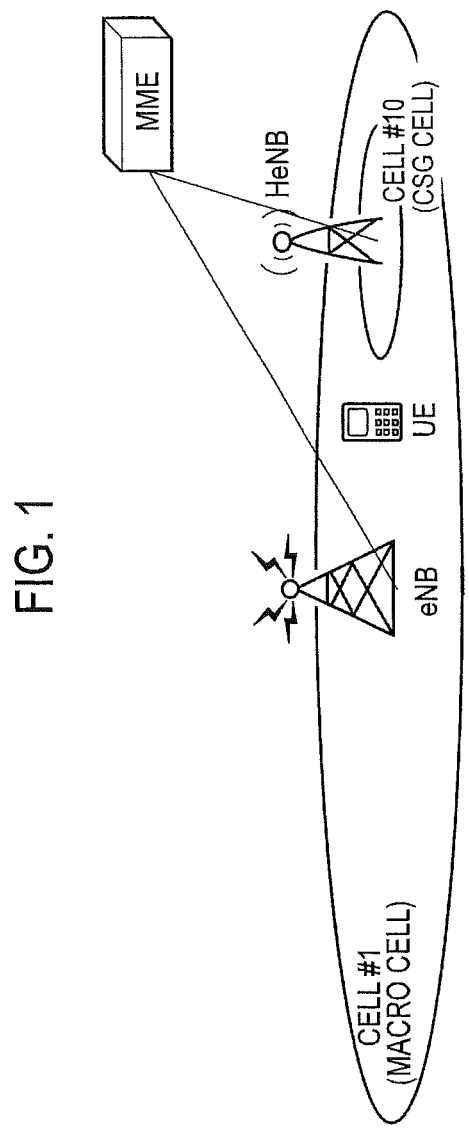
FIG. 1 is an overall configuration diagram of a mobile communication system according to a first embodiment of the present invention.

As illustrated in FIG. 1, the mobile communication system according to the present embodiment is an LTE-Advanced mobile communication system, which includes a mobility management node MME, a radio base station HeNB configured to manage a cell #10, and a radio base station eNB configured to manage a cell #1.

Here, the mobile communication system according to the embodiment may include a gateway apparatus HeNB-GW to accommodate the radio base station HeNB.

In addition, the cell #10 is a CSG cell and the cell #1 is a macro cell. As illustrated in FIG. 1, a coverage area of the cell #10 is deployed to at least partially overlap with a coverage area of the cell #1.

Also, in the mobile communication system according to the embodiment, the mobile station can perform CA using a Pcell and an Scell.

Figure 2:
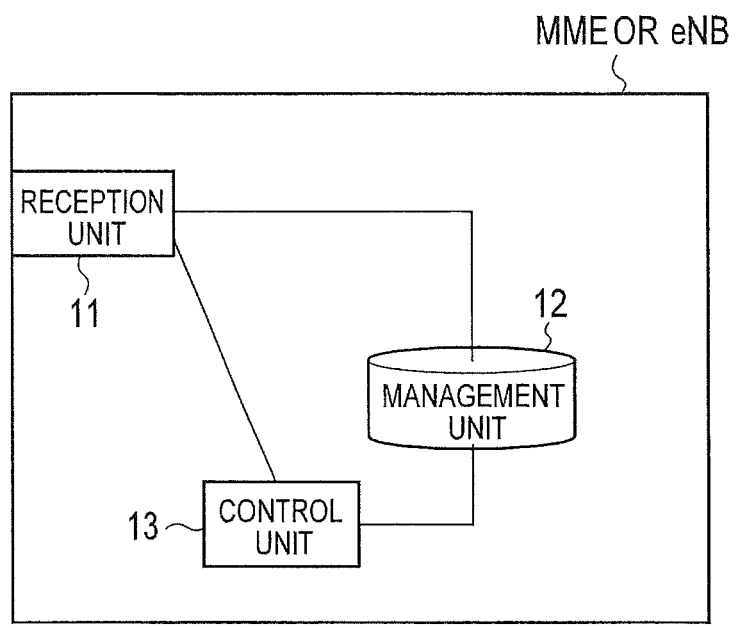
FIG. 2 is a functional block diagram of a mobility management node or a radio base station according to the first embodiment of the invention.

As illustrated in FIG. 2, the mobility management node MME according to the embodiment includes a reception unit 11, a management unit 12, and a control unit 13.

The reception unit 11 is configured to receive various kinds of signals from the radio base station eNB. For example, the reception unit 11 receives Pcell member information or Scell member information from the radio base station eNB.

Here, the Pcell member information is information indicating whether or not the mobile station UE is a member of a Pcell list. The Scell member information is information indicating whether or not the mobile station UE is a member of an Scell list.

In addition, the Pcell list is a list of mobile stations UE allowed to connect to the cell #10 under the radio base station eNB as a Pcell. The Scell list is a list of mobile stations allowed to configure the cell #10 as an Scell.

Here, the Pcell member information and the Scell member information are transmitted from the mobile station UE to the radio base station with "Proximity Indication."

The management unit 12 is configured to manage the Pcell list and the Scell list.

The control unit 13 is configured to determine whether or not the mobile station UE can connect to the cell #10 as a Pcell and determine whether or not the mobile station UE can configure the cell #10 as an Scell based on the Pcell member information, the Scell member information, the Pcell list, and the Scell list.

Here, the control unit 13 may determine whether or not the mobile station UE can configure the cell #10 as an Scell based on a condition of the mobile station UE in addition to the Pcell member information, the Scell member information, the Pcell list and the Scell list.

The employable condition of the mobile station UE is the number of Scells configured in the mobile station UE or the number of Scells active in the mobile station UE, a category of the mobile station UE, or the like.

Also, when the mobile station UE is a member of both the Pcell and Scell, the control unit 13 may determine whether the mobile station UE will connect to the cell #10 as a Pcell or will add the cell #10 as an Scell.

For example, the control unit 13 may determine that the mobile station UE will not connect to the cell #10 as a Pcell when determining that the mobile station UE is highly likely to go out from the cell #10 soon.

Here, when the cell #1 and the cell #10 are managed by the same radio base station eNB, the function of the mobility management node illustrated in FIG. 2 may be provided in the radio base station eNB.

Figure 3:
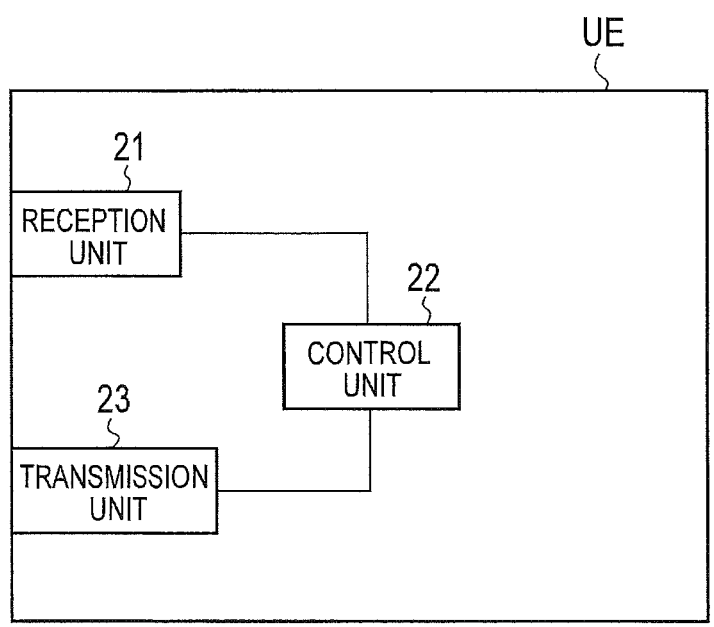
FIG. 3 is a functional block diagram of a mobile station according to the first embodiment of the invention.
Figure 6:
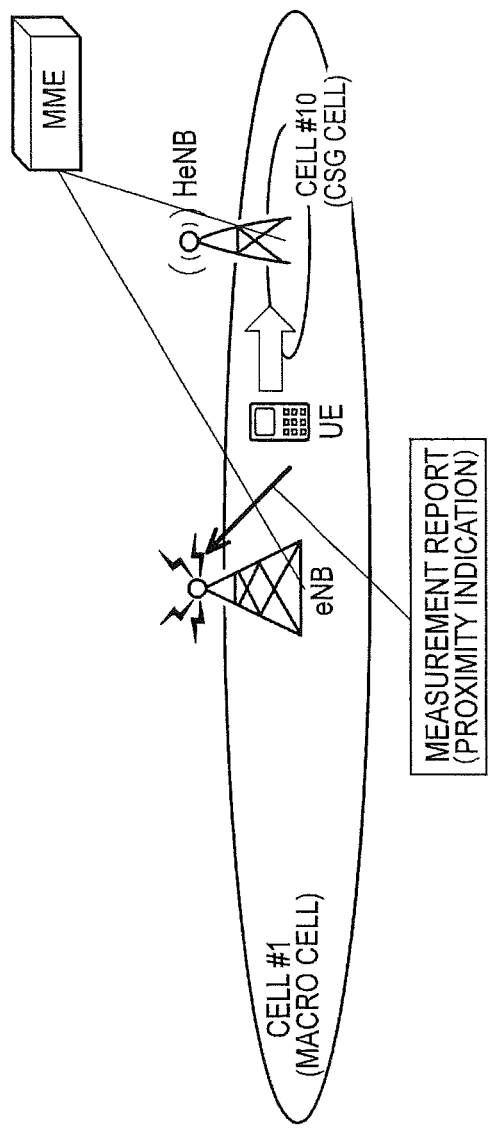
FIG. 6 is a diagram for illustrating a conventional art.
Figure 7:
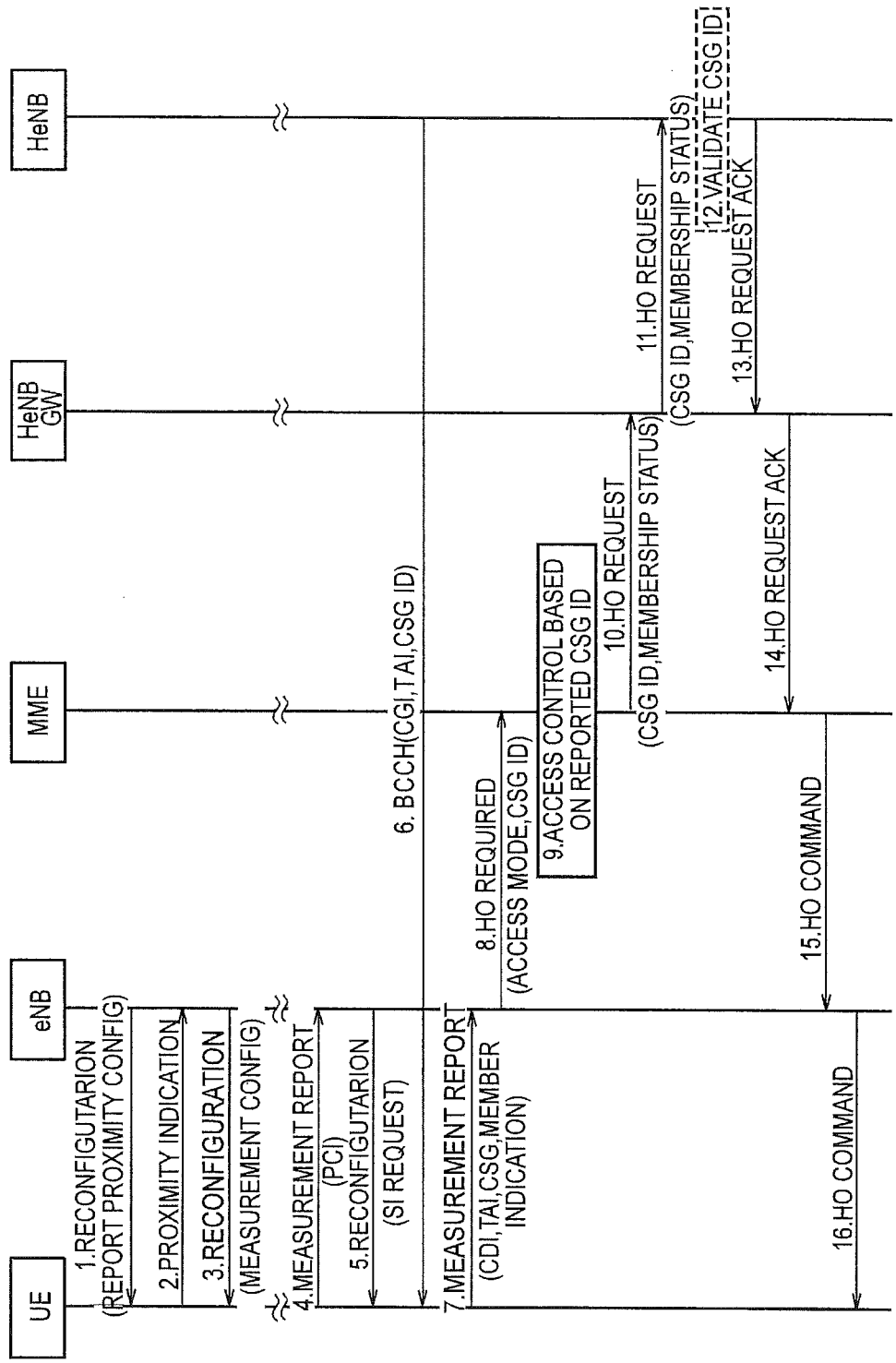
FIG. 7 is a diagram for illustrating the conventional art.
Figure 8:
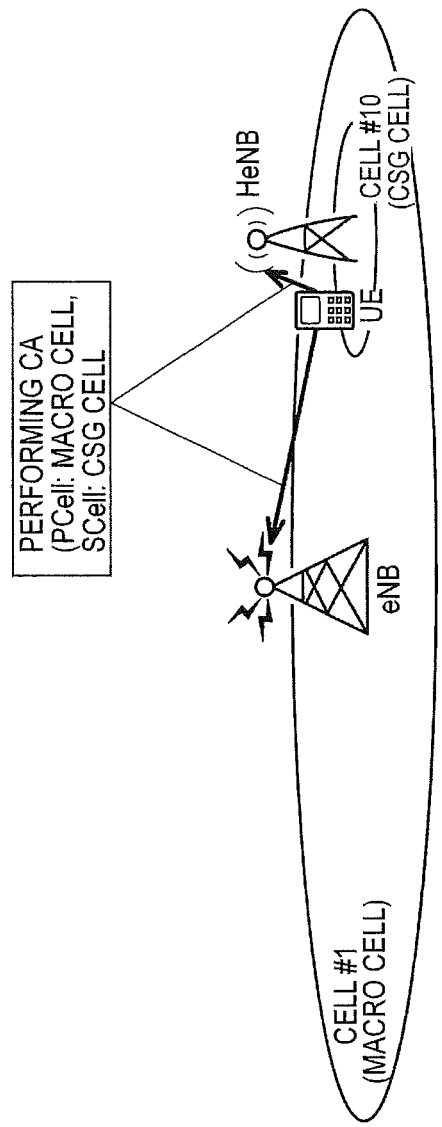
FIG. 8 is a diagram for illustrating the conventional art.

As illustrated in FIG. 3, the mobile station UE according to the embodiment includes a reception unit 21, a control unit 22, and a transmission unit 23.

The reception unit 21 is configured to receive various kinds of signals from the radio base station eNB. The control unit 22 is configured to perform various kinds of control on the mobile station UE. The transmission unit 23 is configured to transmit various kinds of signals to the radio base station eNB.

For example, the reception unit 21 receives an "HO command" and a "RRC connection reconfiguration," and the like.

The transmission unit 23 notifies the radio base station eNB of the Scell member information in addition to the Pcell member information with the "Proximity Indication."

Here, when the mobile station UE is a member of both the Pcell and Scell, the control unit 22 may determine whether or not the mobile station UE will connect to the cell #10 as a Pcell or add the cell #10 as an Scell.

Hereinafter, an operation of the mobile communication system according to the embodiment is described by referring to FIG. 4. Described in an example of FIG. 4 is a case where the cell #1 and the cell #10 are managed by a same radio base station eNB.

As illustrated in FIG. 4, at step S1001, the radio base station eNB transmits "Reconfiguration" reporting "Proximity Config" to the mobile station UE which is in "RRC_Connected state" in the cell #1 and is in the coverage area of the cell #10.

At step S1002, the mobile station UE transmits a "Measurement report" including the "Proximity Indication" to the radio base station eNB.

The "Proximity Indication" includes the Pcell member information and the Scell member information in the cell #10.

Based on the Pcell member information, the Scell member information, the Pcell list, and the Scell list, the radio base station eNB determines whether or not the mobile station UE can connect to the cell #10 as a Pcell and determines whether or not the mobile station UE can configure the cell #10 as an Scell.

When determining to cause the mobile station UE to connect to the cell #10 as a Pcell, the radio base station eNB transmits an "HO command" to the mobile station UE at step S1003.

On the other hand, when determining to cause the mobile station UE to add the cell #10 as an Scell, the radio base station eNB transmits "RRC connection reconfiguration" to the mobile station UE at step S1003.

At step S1004, the mobile station UE transmits "RRC connection reconfiguration" to the radio base station eNB.

Next, an operation of the mobile station UE according to the embodiment is described by referring to FIG. 5.

As illustrated in FIG. 5, when finding the cell #10 which is a CSG cell, the mobile station UE determines whether or not the mobile station UE is a member of the Pcell list at step S101.

When the mobile station UE is determined to be a member of the Pcell list of the cell #10, the operation proceeds to step S102, and when the mobile station UE is determined not to be a member of the Pcell list of the cell #10, the operation proceeds to step S103.

At step S102, the mobile station UE sets the Pcell member information indicating that the mobile station UE is a member of the Pcell list in the "Proximity Indication."

At step S103, the mobile station UE determines whether or not the mobile station UE is a member of the Scell list of the cell #10.

When the mobile station UE is determined to be a member of the Scell list of the cell #10, the operation proceeds to step S104, and when the mobile station UE is determined not to be a member of the Scell list of the cell #10, the operation proceeds to step S105.

At step S104, the mobile station sets the Scell member information indicating that the mobile station UE is a member of the Scell list in the "Proximity Indication."

At step S105, the mobile station UE transmits "Measurement report" including the "Proximity Indication."

In the mobile communication system according to the embodiment, a mobile station UE notifies a radio base station eNB of Scell member information in addition to Pcell member information, and a radio base station eNB or a mobility management node MME determines whether or not the mobile station UE can connect to a cell #10 as a Pcell and determines whether or not the mobile station UE can configures the cell #10 as an Scell by using managing Pcell and Scell lists together with the Pcell member information and Scell member information.

As a result, such a situation can be avoided in the CSG control that a mobile station UE, which is not a CSG member, uses a CSG cell as an Scell.

The features of the present embodiment may also be expressed as follows.

A first feature of the present embodiment is summarized as a mobile communication system, including: a network configured to manage a Pcell list (first list) which is a list of mobile stations UE allowed to connect to a cell #10 under the network as a Pcell (primary cell), and additionally an Scell list (second list) which is a list of mobile stations UE allowed to configure the cell #10 as an Scell (secondary cell). Here, a mobile station UE in the cell #10 notifies the network of Pcell member information (first indication information) indicating whether or not the mobile station UE is a member of the Pcell list, and additionally Scell member information (second indication information) indicating whether or not the mobile station UE is a member of the Scell list, and based on the Pcell member information, the Scell member information, the Pcell list, and the Scell list, the network determines whether or not the mobile station UE is allowed to connect to the cell #10 as a Pcell and determines whether or not the mobile station UE is allowed to configure the cell #10 as an Scell.

A second feature of the present embodiment is summarized as a radio base station eNB, including: a management unit 12 configured to manage a Pcell list which is a list of mobile stations UE allowed to connect to a cell #10 under the radio base station eNB as a Pcell, and additionally an Scell list which is a list of mobile stations UE allowed to configure the cell #10 as an Scell; a reception unit 11 configured to acquire, from a mobile station UE in the cell #10, Pcell member information indicating whether or not the mobile station UE is a member of the Pcell list, and additionally Scell member information indicating whether or not the mobile station UE is a member of the Scell list; and a control unit 13 configured to determine whether or not the mobile station UE is allowed to connect to the cell #10 as a Pcell and determine whether or not the mobile station UE is allowed to configure the cell #10 as an Scell based on the Pcell member information, the Scell member information, the Pcell list, and the Scell list.

A third feature of the present embodiment is summarized as a mobility management node MME, including: a management unit 12 configured to manage a Pcell list which is a list of mobile stations UE allowed to connect to a cell #10 under the mobility management node MME as a Pcell, and additionally an Scell list which is a list of mobile stations UE allowed to configure the cell #10 as an Scell; a reception unit 11 configured to acquire, from a mobile station UE in the cell #10, Pcell member information indicating whether or not the mobile station UE is a member of the Pcell list, and additionally Scell member information indicating whether or not the mobile station UE is a member of the Scell list; and a control unit 13 configured to determine whether or not the mobile station UE is allowed to connect to the cell #10 as a Pcell and determine whether or not the mobile station UE is allowed to configure the cell #10 as an Scell based on the Pcell member information, the Scell member information, the Pcell list, and the Scell list.

A fourth feature of the present embodiment is summarized as a mobile station UE, including: a transmission unit 23 configured to notify a network of Pcell member information indicating whether or not the mobile station UE is a member of a Pcell list, and additionally Scell member information indicating whether or not the mobile station UE is a member of an Scell list.

Here, as described above, when the mobile station UE transmits the Scell member information indicating whether or not the mobile station UE is a member of the Scell list in addition to the Pcell member information indicating whether or not the mobile station UE is a member of the Pcell list, the mobile station UE notifies the Pcell member information and the Scell member information by different messages.

Furthermore, the mobile station UE may notify any one of the Pcell member information and the Scell member information.

In such a case, the radio base station eNB may instruct which one of the Pcell member information and the Scell member information is notified. The notification may be performed in any layer of a RRC layer, PDCP layer, RLC layer, MAC layer, physical layer, and the like.

It should be noted that the foregoing operations of the mobile stations UE and radio base station eNB#A may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the mobile stations UE and radio base station eNB#A. Otherwise, the storage medium and the processor may be provided as discrete components inside the mobile stations UE and radio base station eNB#A.

Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2012-217071 (filed on Sep. 28, 2012) is incorporated by reference in the present specification.

INDUSTRIAL APPLICABILITY

As described above, the present invention can provide a mobile communication system, a radio base station, a mobility management node, and a mobile station, which are capable of avoiding a situation where a mobile station UE, which is not a CSG member, uses a CSG cell as an Scell in CSG control.

EXPLANATION OF REFERENCE NUMERALS eNB#A radio base station
UE mobile station
11 management unit
12, 21 reception unit
13 determination unit
14, 22 transmission unit

The invention claimed is:

1. A mobile communication system, comprising:
a network configured to manage a first list which is a list of mobile stations allowed to connect to a cell under the network as a primary cell, and additionally a second list which is a list of mobile stations allowed to configure the cell as a secondary cell, wherein
a mobile station in the cell notifies the network of at least one of first indication information indicating whether or not the mobile station is a member of the first list and second indication information indicating whether or not the mobile station is a member of the second list, wherein the mobile station is capable of performing a carrier aggregation using the primary cell and the secondary cell, and
based on at least one of the first indication information and the second indication information and at least one of the first list and the second list, the network determines whether or not the mobile station is allowed to connect to the cell as a primary cell and determines whether or not the mobile station is allowed to configure the cell as a secondary cell.

2. A radio base station, comprising:
a management unit configured to manage a first list which is a list of mobile stations allowed to connect to a cell under the radio base station as a primary cell, and additionally a second list which is a list of mobile stations allowed to configure the cell as a secondary cell;
a reception unit configured to acquire, from a mobile station in the cell, at least one of first indication information indicating whether or not the mobile station is a member of the first list and second indication information indicating whether or not the mobile station is a member of the second list, wherein the mobile station is capable of performing a carrier aggregation using the primary cell and the secondary cell; and
a control unit configured to determine whether or not the mobile station is allowed to connect to the cell as a primary cell and determine whether or not the mobile station is allowed to configure the cell as a secondary cell by referring to the management unit based on the at least one of the first indication information and the second indication information.

3. A mobility management node, comprising:
a management unit configured to manage at least one of a first list which is a list of mobile stations allowed to connect to a cell under the mobility management node as a primary cell and a second list which is a list of mobile stations allowed to configure the cell as a secondary cell;
a reception unit configured to acquire, from a mobile station in the cell, at least one of first indication information indicating whether or not the mobile station is a member of the first list and second indication information indicating whether or not the mobile station is a member of the second list, wherein the mobile station is capable of performing a carrier aggregation using the primary cell and the secondary cell; and
a control unit configured to determine whether or not the mobile station is allowed to connect to the cell as a primary cell and determine whether or not the mobile station is allowed to configure the cell as a secondary cell by referring to the management unit based on the at least one of the first indication information and the second indication information.

4. A mobile station, comprising:
a transmission unit configured to notify a network of at least one of first indication information indicating whether or not the mobile station is a member of a first list and second indication information indicating whether or not the mobile station is a member of a second list, wherein
the first list is a list of mobile stations allowed to connect to a cell under the network as a primary cell,
the second list is a list of mobile stations allowed to configure the cell as a secondary cell, and
the mobile station is capable of performing a carrier aggregation using the primary cell and the secondary cell.

* * * * *